United States Patent [19]
Muppidi et al.

[11] Patent Number: 5,090,051
[45] Date of Patent: Feb. 18, 1992

[54] RADIO COMMUNICATION SYSTEM AND METHOD FOR CONNECTING AN INCOMING CALL TO A WIRELESS TELEPHONE

[75] Inventors: Prabhakar Muppidi; Gary S. Lobel, both of Boynton Beach; Steven C. Shapiro, Lake Worth, all of Fla.

[73] Assignee: Motorola, Inc., Schaumburg, Ill.

[21] Appl. No.: 671,183

[22] Filed: Mar. 18, 1991

Related U.S. Application Data

[63] Continuation of Ser. No. 484,097, Feb. 22, 1990, abandoned.

[51] Int. Cl.[5] .......................................... H04M 11/00
[52] U.S. Cl. .......................................... 379/61; 379/63
[58] Field of Search ............................ 379/58-61, 379/63; 455/33, 54

[56] References Cited

U.S. PATENT DOCUMENTS

| | | | |
|---|---|---|---|
| 4,228,319 | 10/1980 | De Jager et al. | 379/60 |
| 4,748,655 | 5/1988 | Thrower et al. | 379/58 |
| 4,768,219 | 8/1988 | Yamagata et al. | 379/63 |
| 4,771,448 | 9/1988 | Koohgoli | 379/59 |
| 4,850,032 | 7/1989 | Freeburg | 455/54 |

FOREIGN PATENT DOCUMENTS 0058341  3/1986  Japan ................................ 379/61

OTHER PUBLICATIONS

Publication: *Electronics & Wireless World*, "A Cordless Future", Dec. 1988, pp. 1198-1199.

Primary Examiner—James L. Dwyer
Assistant Examiner—Dwayne D. Bost
Attorney, Agent, or Firm—Daniel K. Nichols

[57] ABSTRACT

This radio communication system includes a plurality of remote base stations or callpoints. When an incoming call is to be directed to a cordless telephone, the identifying information for the cordless telephone, along with a call back number or ID is transmitted as by a paging signal by a PABX. Each of the base stations includes a paging receiver for receiving the information. If the base station has a line available it initiates a call to the cordless telephone. A base station that locates the cordless telephone would provide the connection for the call. By calling the PABX utilizing the call back ID, the base station can complete the call.

2 Claims, 3 Drawing Sheets

RADIO COMMUNICATION SYSTEM AND METHOD FOR CONNECTING AN INCOMING CALL TO A WIRELESS TELEPHONE

This is a continuation of application Ser. No. 07/484,097, filed Feb. 22, 1990, and now abandoned.

BACKGROUND OF THE INVENTION

This invention relates to radio communication systems in general and particularly to a system for interconnecting telephone calls to portable radio devices. The second generation cordless telephone system or CT-2 system that has been proposed envisions utilization of a plurality of RF channels for radio communication. The proposed system would include forty channels for providing the RF links between the cordless telephones or CT-2 handsets and the base system which is connected to the existing telephone network. In operation, when the user is at his home base, telephone calls would be transmitted via the home base to the cordless telephone. When away from the home base, the cordless telephone unit can be used to originate telephone calls when the user is within range of a telepoint or callpoint. To originate a call, the cordless telephone would scan the 40 channels to find an available channel and then attempt to access the telepoint. The telepoint, likewise, would be scanning the forty available channels for incoming radio calls and when it received a call request from a cordless telephone would provide the telephone interconnection. Such a system, provides for the placement of calls from the cordless telephone while away from home base. However, it is not readily adaptable to the reception of phone calls. There have been proposals to include a wide area paging receiver within the cordless telephone in order to receive messages such as the fact that a call has been made to the cordless telephone number. Such an approach necessitates that the cordless telephone must be able to receive the page message, thereby complicating the cordless telephone design.

In other radio telephone systems, such as cellular radio, substantial infrastructure is required including a control channel for locating cellular phones in order to connect calls to a cellular phone. It would be desirable to have a simple method of locating a cordless telephone in a system, such as the proposed CT-2 system.

SUMMARY OF THE INVENTION

This radio communication system includes a plurality of remote base stations or callpoints. When an incoming call is to be directed to a cordless telephone, the identifying information for the cordless telephone, along with a call back number or ID is transmitted as by a paging signal. Each of the base stations, can include a paging receiver for receiving the information. If the base station has a line available, it would then initiate a call to the cordless telephone. A base station locating the cordless telephone would provide the connection for the call.

DESCRIPTION OF THE PREFERRED EMBODIMENT

Figure 1:
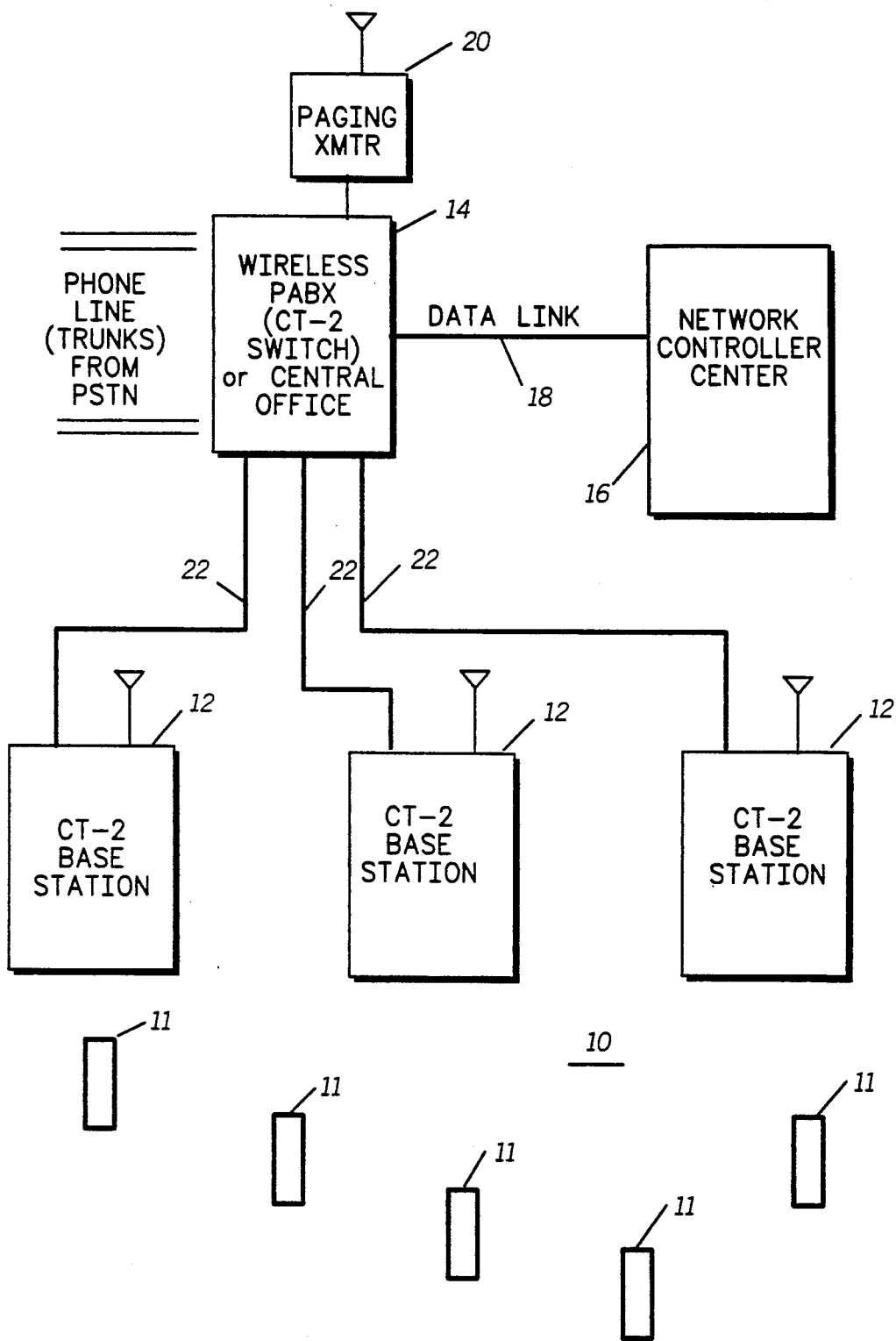
FIG. 1 is a block diagram of a radio communication system in accordance to the present invention.

Referring now by characters of reference of the drawings and first to FIG. 1, it will be understood that the radio communication system 10 is designed to interface cordless telephones to the Public Switched Telephone Network (PSTN). While the preferred embodiment is illustrated in the context of a CT-2 system, other similar systems could be utilized. In this system 10, a plurality of portable radio telephone devices, such as CT-2 handsets 11 can interface with the PSTN via any one of a plurality of CT-2 base stations 12. Each CT-2 handset, 11 is designed as a low power transceiver which, when at its home base, is designed for receiving and originating telephone calls. When away from its home base, the handset 11 can originate calls if it is within range of a CT-2 base station 12. The present invention provides means for attempting to locate a CT-2 handset 11 when it is at a location other than its home base station. In operation, it is envisioned that each CT-2 handset would have two address codes, or phone numbers corresponding to home location and one for use when it is away from its home location.

When a telephone user desires to contact a CT-2 handset user who is away from his home base, a telephone number corresponding to the remote ID would be dialed to connect the phone user to the wireless PABX 14, which can be a CT-2 switch or a central telephone office. Such a wireless PABX can be coupled to a network controller center 16 via a data link 18 for purposes of system billing, handset ID, and the like. When a call is received at the wireless PABX 14 for a particular CT-2 handset 11, the wireless PABX would originate a paging message, which would include an ID for the called CT-2 handset as well as connection information for connecting the CT-2 handset with the incoming phone call at the PABX. This information would be transmitted, as via a wide area paging transmitter 20. Each of the CT-2 base stations 12 include a paging receiver for receiving the page transmissions. The CT-2 base stations are also connected to the wireless PABX as by phone lines or trunks 22.

Each CT-2 base station 12 can include a plurality of transceivers, as for example 6 for the simultaneous connection of up to 6 CT-2 handsets to 6 phone lines. In a CT-2 system forty RF channels are available for use by the handsets 11 and base station 12. If a CT-2 base station 12 has an available transceiver and phone line when the page is received, the base station would choose one of the available RF channels and transmit a call with the called CT-2 handsets ID. Such calls could go on essentially simultaneously at the various CT-2 base stations 12 but would not necessarily be made on the same frequency. Each of the CT-2 handsets 11, if not in use, would have a receive mode in which it would be scanning the forty RF channels for calls with its ID. In the event that a page has been made for a CT-2 handset which is in range of a CT-2 base station 12, having an available transceiver/phone line, the call that is made over one of the six voice channels would be received by the CT-2 handset which would then automatically acknowledge a call. The CT-2 base station, on receipt of the acknowledgement, would respond by dialing the wireless PABX 14 using the communication phone line ID received with the page and would also ring a signal to similarly causing a ring on the CT-2 handset to alert the user to the incoming phone call.

Figure 2:
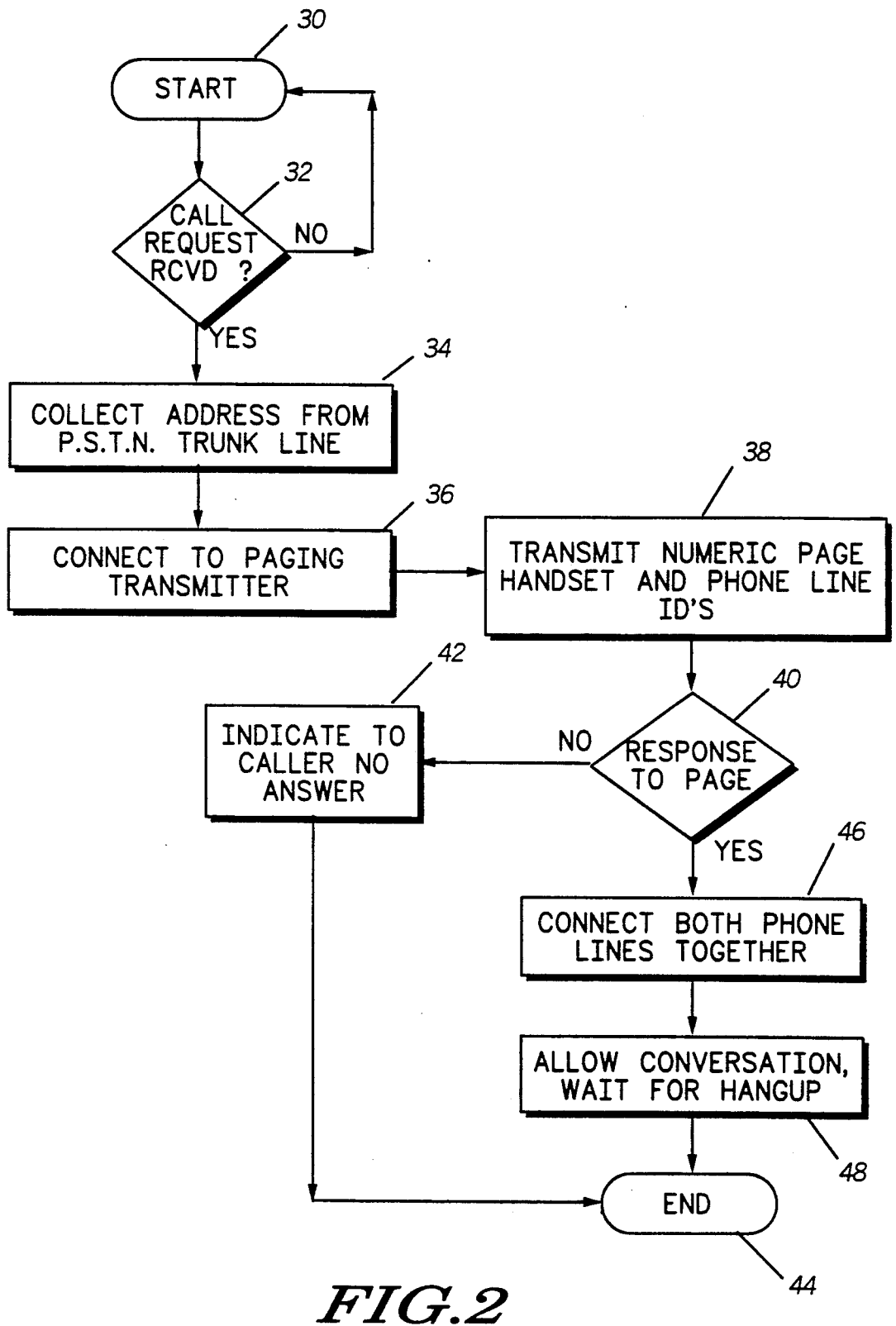
FIG. 2 is a flow chart of the operation of the wireless PABX of FIG. 1.

The operation of the wireless PABX 14 is illustrated in the flow chart of FIG. 2. Beginning with start block 30, the wireless PABX 14 monitors the incoming phone lines to see if a call request has been received, decision block 32. If so, the address from the PSTN trunk line is identified, block 34, and the PABX then connects to the paging transmitter 20, block 36 to transmit a numeric page which would include the handset and phone line ID information, block 38. The PABX then monitors for a response to the page, decision block 40. If no response is received, an indication such as a digitized message would be given to the caller that there has been no answer, block 42 and the routine would then end, block 44 returning to start block 30. If a response is received, the phone lines from the CT-2 base station 12 and the incoming phone call would be connected together, block 42 and the wireless PABX would maintain the interconnection for the duration of the conversation, until a hang-up is detected, block 44. At that point the routine would end, block 44 and return to start block 30.

Figure 3:
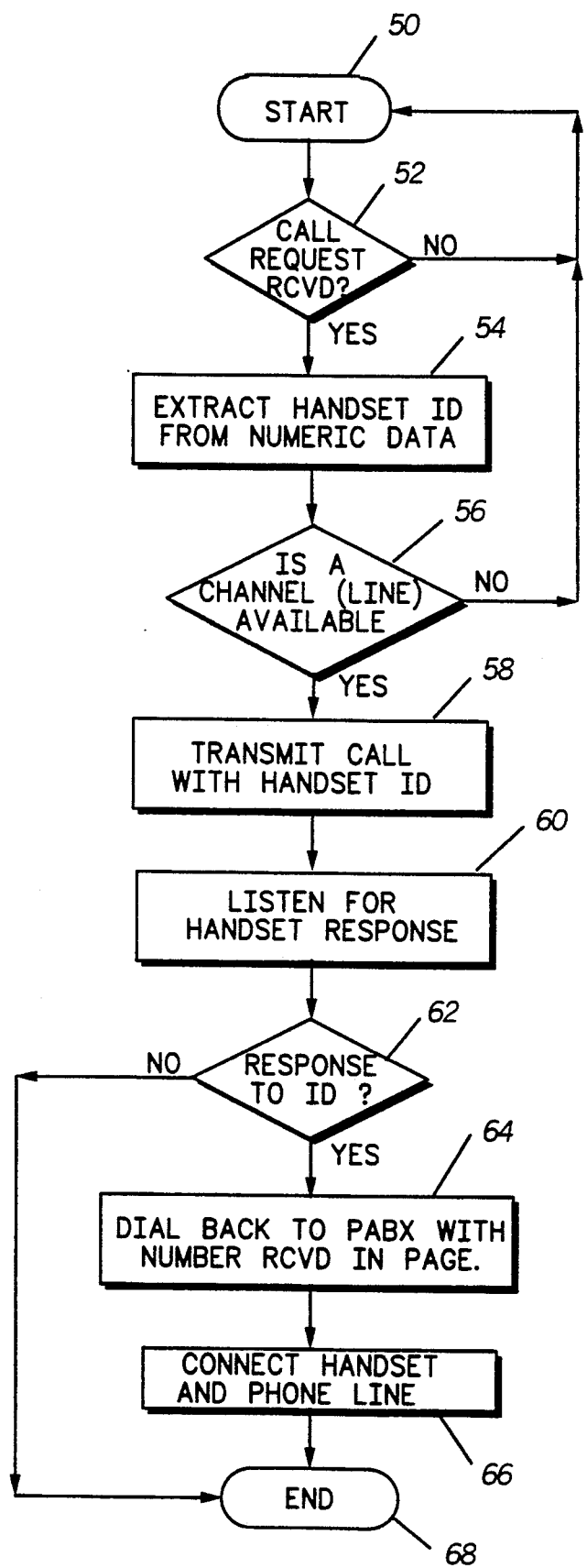
FIG. 3 is a flow chart of the operation of a base station of FIG. 1.

The operation of the base station 12 is illustrated in flow chart FIG. 3. The routine starts at block 50 and examines whether a call request has been received as via the paging signal, decision block 52. If not, the routine continues to monitor for a call request. When a call request is received, the handset ID is extracted from the numeric data, block 54. The base station then determines if a transceiver/phone line is available, decision block 56. If not the routine returns to start and does not attempt to locate the called handset 11. If a voice channel is available, a call including the handset ID is transmitted and an available RF channel, block 58. The channel is monitored, block 60, for a handset response. If no response is received the routine would end and return to start, decision block 62. If response is received, the base station would dial back to the PABX, block 64 utilizing the number received in the page and the CT-2 base station would provide the RF connection between the handset and phone line, block 66 until the conversation is ended, block 68.

It will be appreciated that this system does not require the use of a control channel for communications between the base stations 12 and handsets 11. The locating of a particular handset 11 is accomplished by utilizing one of the available CT-2 RF channels. Consequently, the handset need only be monitoring these RF channels as by scanning. If a handset is within range of a base station that is not currently fully utilized, the handset can be located and connected to an incoming phone call.

We claim as our invention:

1. A method of connecting an incoming telephone call to a wireless telephone comprising the steps of:
   at a central system:
      receiving an incoming telephone call for a particular wireless telephone; and
      transmitting a radio paging signal including ID information for the called wireless telephone and further including telephone line ID information; and
   at a plurality of base stations:
      receiving the transmitted radio paging signal ID information;
      if a telephone line is available at the individual base station, selecting an available voice channel and transmitting a call to the called wireless telephone on said voice channel; and
      if a response is received from the wireless telephone utilizing the telephone line ID information to provide a connection to the incoming telephone call.

2. A radio communication system for connecting radios to a telephone network comprising:
   a plurality of portable radio units;
   a plurality of base stations for selectively interconnecting said portable radio units to the telephone network;
   a central system for receiving incoming telephone calls and for transmitting radio paging signals including ID information for called portable radio units and further including telephone ID information to the plurality of base stations;
   the base stations each including means for receiving the transmitted radio paging signal ID information and means for determining if a telephone line is available, each base station transmitting a call to the called portable radio unit on a voice channel only if a telephone line is available, and further including means utilizing the telephone ID information for selectively interconnecting said portable radio units to incoming telephone calls.

* * * * *